No. 768,546. PATENTED AUG. 23, 1904.
L. SILCOTT.
TWYER IRON.
APPLICATION FILED MAR. 7, 1904.
NO MODEL.
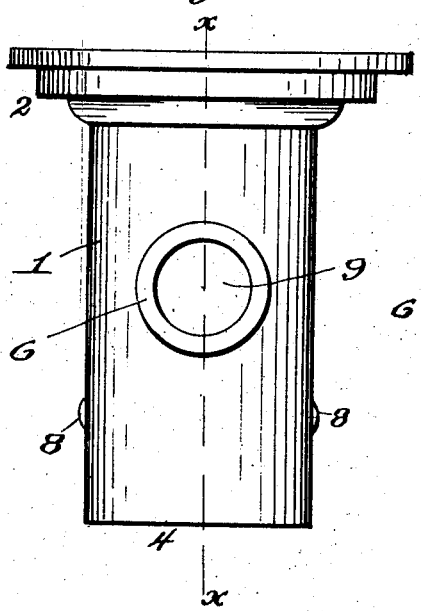
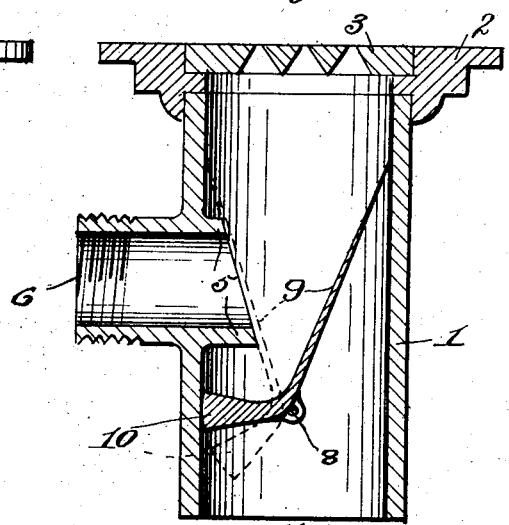
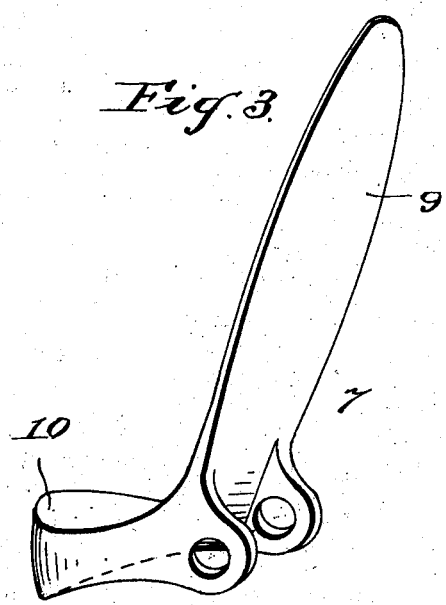
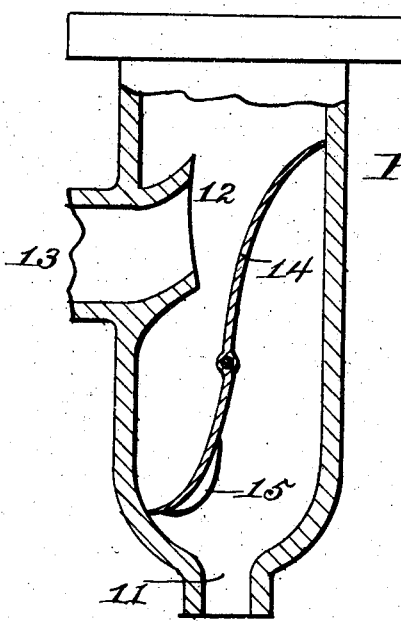
Witnesses
L. E. Money
V. H. Whitman
Inventor
Loudon Silcott
By 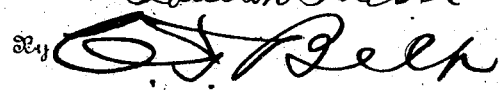
Attorney No. 768,546.

Patented August 23, 1904.

UNITED STATES PATENT OFFICE.

LOUDON SILCOTT, OF MOUNT VERNON, OHIO.

TWYER-IRON.

SPECIFICATION forming part of Letters Patent No. 768,546, dated August 23, 1904.

Application filed March 7, 1904. Serial No. 196,995. (No model.)

*To all whom it may concern:*

Be it known that I, LOUDON SILCOTT, a citizen of the United States, residing at Mount Vernon, in the county of Knox and State of Ohio, have invented certain new and useful Improvements in Twyer-Irons, of which the following is a specification.

This invention relates to twyer-irons, and pertains especially to the class of such irons having a valve or damper located in the path of the air-blast to control the latter.

The object of this invention is to provide an improved twyer-iron the construction and arrangement of which will produce certain advantages over the class of devices pertaining thereto.

A further object of the invention is to provide a twyer-iron which is self cooling and cleaning and which has a loosely-hung valve or damper operated by air-pressure from a blast-nozzle to open and close the nozzle.

A still further object of the invention is to provide an open-end twyer-iron having a nozzle with a valve loosely pivoted in the iron and comprising two members, one of which works between the nozzle and the iron wall opposite the nozzle to open and close the latter and the other of which works against the iron wall under the nozzle when the latter is open to close communication between the bottom end of the iron and the grate.

In the accompanying drawings, forming part of this application, Figure 1 is an elevation looking at the end of the nozzle. Fig. 2 is a sectional view on the line $x\ x$, Fig. 1, showing in dotted lines the nozzle closed. Fig. 3 is a detail view of the valve or damper. Fig. 4 is a section of a modification.

The same numeral references denote the same parts throughout the several views of the drawings.

The cylindrical body 1 is fitted with the usual cap-plate 2, having a grate-plate 3 and terminating in an open bottom 4. The blast-nozzle 6 is made with external and internal screw-threads, so that a blast-pipe may be screwed into or over it, and said nozzle has a projection 5, provided with an inclined face and extending into the cylinder and in the path of a valve or damper 7. The valve or damper 7 is pivoted at 8 central of the cylinder and on a line with the inclined nozzle end and has an elliptical wing 9, extending from the pivot 8 to engage the nozzle and the wall of the iron opposite the nozzle, and a semicircular wing 10, extending from the pivot at an angle to the wing 9, so as to counterbalance the latter and to engage the wall of the iron under the nozzle when air-pressure is directed upon the wing 9 from the nozzle, and when there is no such pressure the wing 10 will drop, and thereby swing the wing 9 against the nozzle and close it. The peculiar shape of the wings afford a bearing for them upon the inner circumference of the cylinder. The inclined face of the nozzle forms a seat for the wing 9, and the weighted wing 10 will hold the wing 9 close upon the seat until a blast or air-pressure sufficient to overcome the wing 10 is applied to the wing 9 from the nozzle, whereupon the wing 9 will be forced against the wall of the iron opposite the nozzle, and thereby open the blast-channel from the nozzle to the grate. Simultaneous with the opening of the nozzle the wing 10 engages the wall of the iron under the nozzle and, with the wing 9, closes the bottom of the cylinder or separates the bottom cylinder-opening from the nozzle and from the grate. In this position of the valve the wing 9 forms a chute for ashes and particles of combustion from the grate onto the wing 10, and when the wing 10 drops it discharges through the bottom of the cylinder.

Referring to the modification shown in Fig. 4, the cylinder has a contracted lower opening 11, adapted to have a pipe attached thereto, and an upturned end 12 of the nozzle 13 extends into the path of an S-shaped valve 14, having a weight 15.

Having thus described my invention, what I claim as new, and desire to secure by Letters Patent, is—

1. A twyer-iron comprising a cylinder having a blast-opening, and a valve pivoted within the cylinder and comprising wings one at an angle to the other and both engaging the inner circumference of the cylinder in opening and closing the latter and the said blast-opening.

2. A twyer-iron comprising a cylinder having a blast-opening, and a valve pivoted within the cylinder and comprising wings fitting the inner circumference of the cylinder and operated by air-pressure from the opening to admit the blast, one of said wings counterbalancing the other to close the said opening.

3. A twyer-iron comprising a cylinder having a blast-opening, and a valve pivoted within the cylinder and comprising an elliptical-shaped member and a semicircular member both of which coact with the inner circumference of the cylinder in opening and closing the latter and the said blast-opening.

4. In a twyer-iron, the combination, with the cylinder, and a nozzle having a projection extending into the cylinder, and provided with an inclined face forming a valve-seat, of a two-part valve loosely pivoted in the cylinder, one of said parts being acted upon by an air-blast from the nozzle to open the latter, and the other of said parts overbalancing to close the nozzle.

5. In a twyer-iron, the combination, with the cylinder having a suitable grate at one end and the other end open, and a nozzle having a projection extending into the cylinder and terminating in an inclined face forming a valve-seat, of a valve loosely hung below the nozzle on a line with the inclined face and operated by a weighted valve member to seat the valve and open communication between the grate and the open end, said valve being unseated by air-pressure from the nozzle to close said communication.

6. In a twyer-iron, the combination, with a cylinder, and a valve-seat projecting into the cylinder, of a valve loosely pivoted in the cylinder and comprising two wings fitting the inner circumference of the cylinder, one of the wings counterbalancing to seat the other, and the latter being operated by air-pressure to unseat it.

7. A valve for twyer-irons comprising a tapering wing, a wing having an increased thickness from and positioned at an angle to the tapering wing, and pivot-ears at the juncture of the two wings.

In witness whereof I hereunto set my hand in the presence of two witnesses.

LOUDON SILCOTT

Witnesses:
R. M. GREER,
ELIZABETH D. COLE.